(12) United States Patent
Bean

(10) Patent No.: US 6,286,214 B1
(45) Date of Patent: Sep. 11, 2001

(54) SELF-EXTRUDED BUSHING ASSEMBLY AND METHOD OF MAKING THE SAME

(75) Inventor: William C. Bean, Oxford, MI (US)

(73) Assignee: Cosma International Inc., Concord (CA)

(*) Notice: Subject to any disclaimer, the term of this patent is extended or adjusted under 35 U.S.C. 154(b) by 0 days.

(21) Appl. No.: 09/250,132

(22) Filed: Feb. 16, 1999

Related U.S. Application Data

(60) Provisional application No. 60/074,901, filed on Feb. 17, 1998.

(51) Int. Cl.[7] ..................................... B21D 53/88
(52) U.S. Cl. .................. 29/897.2; 29/896.91; 29/432.2; 29/505; 29/525
(58) Field of Search ................... 29/897.2, 897.312, 29/525, 432.2, 505, 282, 255, 898.07, 896.91, 451, 432.1, 432, 898.054, 898.056, 898.057; 403/274, 283, 279, 282, 244

(56) References Cited

U.S. PATENT DOCUMENTS

| | | | |
|---|---|---|---|
| 2,756,495 | * | 7/1956 | Lathrop ............................. 29/898.07 |
| 3,429,033 | * | 2/1969 | Callaghan ............................ 403/244 |
| 3,429,600 | * | 2/1969 | Edie et al. ........................... 403/244 |
| 4,207,659 | * | 6/1980 | Rozentals ........................... 29/898.07 |
| 4,321,987 | * | 3/1982 | Dressell, Jr. et al. .................. 29/525 |
| 4,397,224 | * | 8/1983 | Walker ................................ 29/432 |
| 4,597,687 | * | 7/1986 | Colas .................................. 403/282 |
| 4,688,952 | * | 8/1987 | Setele ............................... 29/898.07 |
| 4,810,143 | * | 3/1989 | Muller ................................ 403/274 |
| 4,825,527 | * | 5/1989 | Ladouceur ............................ 29/432 |
| 5,029,385 | * | 7/1991 | Daniels ................................ 29/525 |
| 5,159,754 | * | 11/1992 | Vancsik ............................. 29/898.07 |
| 5,315,752 | * | 5/1994 | Ohta et al. ............................ 29/525 |
| 5,333,380 | * | 8/1994 | Patz et al. ......................... 29/898.07 |
| 5,335,411 | * | 8/1994 | Muller et al. ........................ 403/282 |
| 5,445,483 | * | 8/1995 | Fultz ................................ 29/432.2 |
| 5,489,176 | * | 2/1996 | Fultz ................................ 29/432.2 |
| 5,516,176 | * | 5/1996 | Kimoto et al. ...................... 216/35.1 |
| 5,517,744 | | 5/1996 | Moser et al. . |
| 5,623,756 | * | 4/1997 | Yanagidate et al. .................. 29/525 |
| 5,743,015 | * | 4/1998 | Kunze et al. ...................... 29/898.07 |

\* cited by examiner

*Primary Examiner*—S. Thomas Hughes
*Assistant Examiner*—Trinh Nguyen
(74) *Attorney, Agent, or Firm*—Pillsbury Winthrop LLP

(57) ABSTRACT

A method for mounting a bushing into a metal member which comprises providing a metal member forming a bushing receiving opening in the metal member, the opening defined by an annular edge portion surrounding the opening. A bushing is then forced through the opening in a bushing driving direction such that the bushing engages the annular edge portion and deforms the annular edge portion in the bushing driving direction to form an annular flange portion on the metal member which projects in the driving direction and engages an exterior surface of the bushing in an interference fit relation so as to securely retain the bushing within the opening.

27 Claims, 4 Drawing Sheets

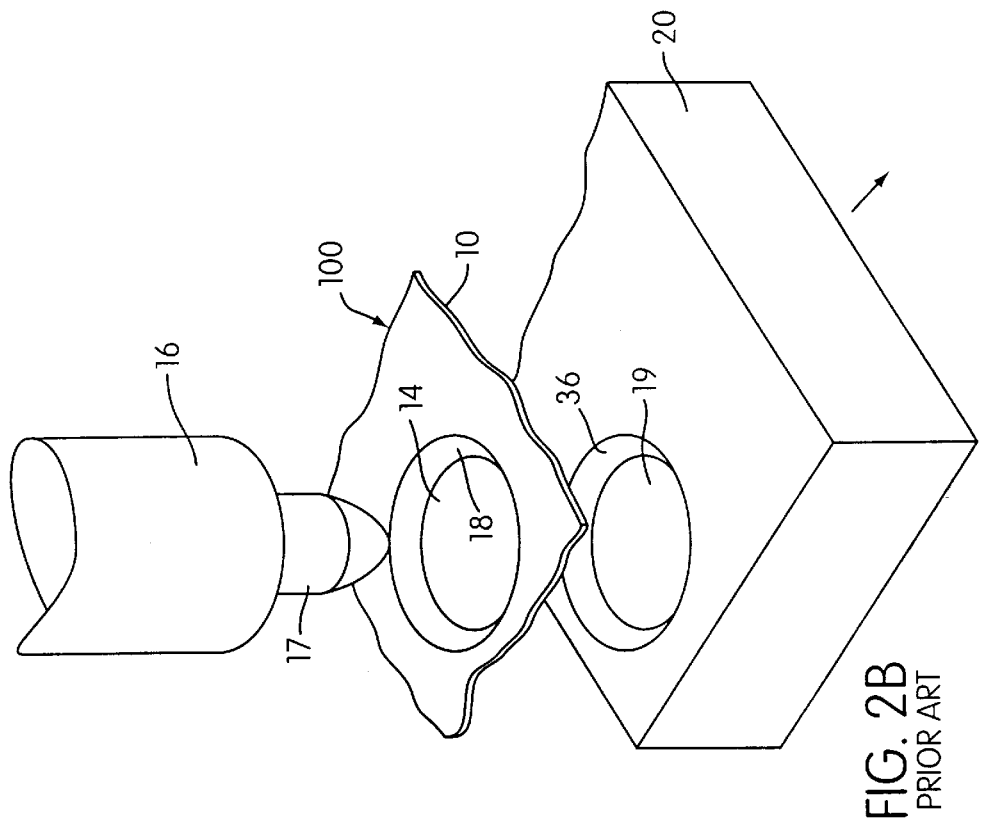
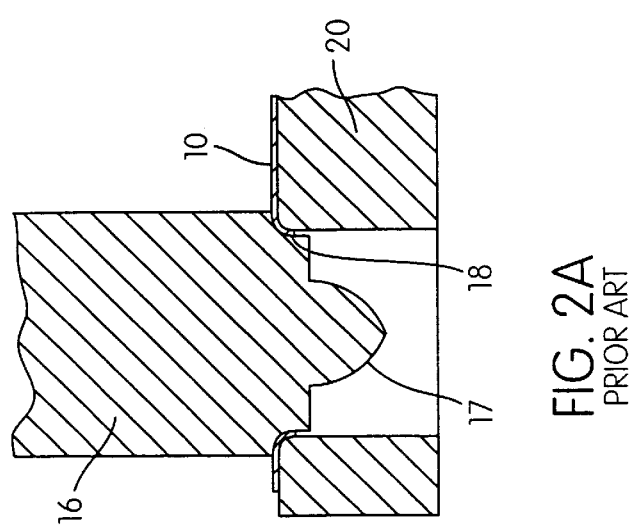
FIG. 2B
PRIOR ART
FIG. 2A
PRIOR ART

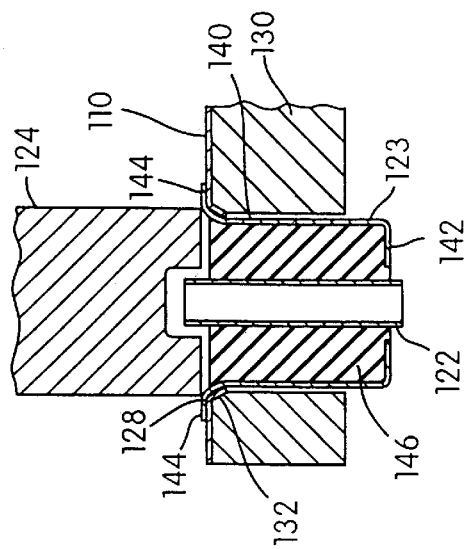
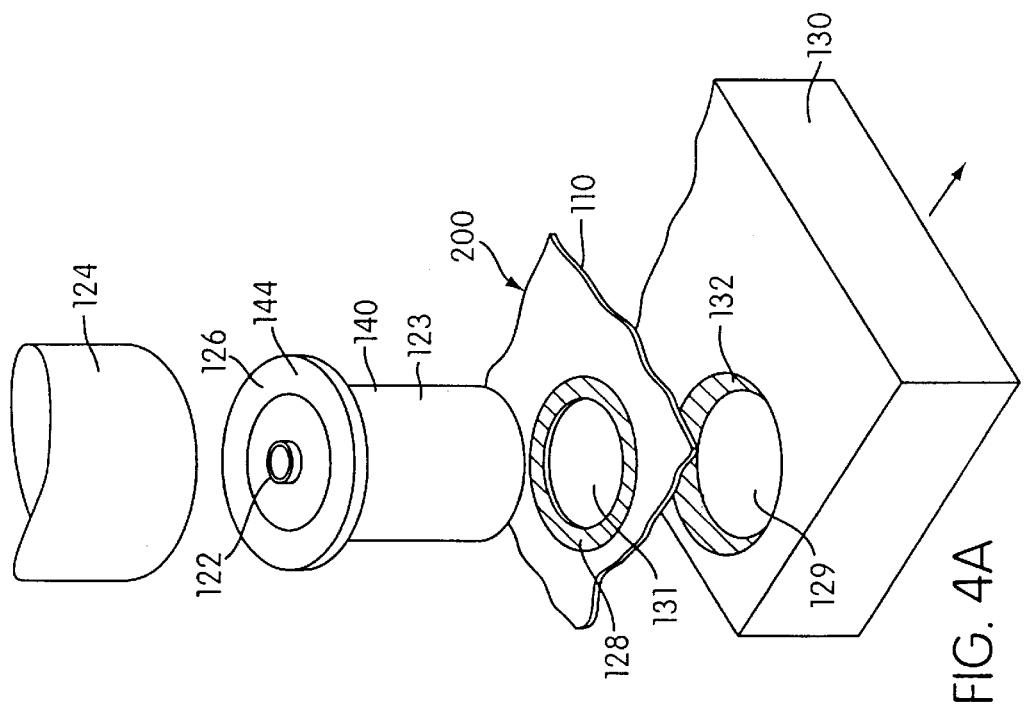

SELF-EXTRUDED BUSHING ASSEMBLY AND METHOD OF MAKING THE SAME

The present application claims priority to U.S. Provisional Patent Application of Bean, Ser. No. 60/074,901, filed Feb. 17, 1998, the entirety of which is hereby incorporated into the present application by reference.

FIELD OF THE INVENTION

The present invention relates to a method for mounting a bushing into a sheet metal member and also to a sheet metal member and bushing assembly. The present invention more particularly relates to a vehicle frame member and a method for making the same with a shock absorbing mounting portion.

BACKGROUND OF THE RELATED ART

One method of installing a bushing into a sheet metal member, such as a hydroformed tubular member, requires piercing or blanking a hole in a portion of the sheet metal member. The sheet metal member is then passed on to a secondary operation where the edge portion surrounding the pierced or blanked hole is extruded or drawformed to form an annular flange portion. A steel bushing is forced into the opening so as to form an interference fit between the annular flange portion and the bushing. A tight tolerance is required between the extruded drawformed annular flange portion and the bushing to provide the appropriate interference fit.

FIGS. 1A–3B illustrate conventional methods of installing a bushing in a hydroformed motor vehicle frame member. FIGS. 1A and 1B illustrate a punch 11 fastened to an upper moving ram of a reciprocating press, and an extrusion die 12 fixed to a lower stationary press bed. A tubular metal frame member which has been hydroformed from a seam-welded piece of sheet metal is partially shown and indicated at 100.

The extrusion die 12 is inserted in an open end of the hydroformed tubular member 100 and then lifted upwards to support the underside of an upper wall 10 of the member 100. The press ram then begins its downward stroke to force the punch 11 into contact with the metal material of the upper wall 10, as shown in FIG. 1A. When the press tonnage overcomes the tensile strength of the metal wall 10, the punch 11 shears the metal wall 10 against an opening 13 in die 12. The die opening 13 is defined at its upper end by a "hard" or 90° corner 35.

The scrap material or slug 15 passes through the die opening 13 and is eventually discarded, leaving hole 14 in the upper wall 10 of the tubular member 100. The diameter of the hole 14 corresponds to the outer diameter of punch 11. As shown in FIG. 1B, the press ram then starts its upward movement back to its starting position to move punch 11 away from the tubular member 100, and the tubular member 100 is then removed from the extrusion die 12. As a result of this hole forming operation, the edge portion surrounding the hole 14 will have a sharp, burred corner.

As shown in FIGS. 2A and 2B, after hole 14 is formed, the tubular member 100 is then moved to a drawforming station. At the drawforming station, a second die 20 is positioned inside the tubular member 100 and a press ram with a drawforming punch 16 is then cycled through a downstroke to locate a punch pilot 17 in alignment with the hole 14. The press ram then continues its downstroke to force a forming portion of the punch into engagement with the inner edge portion surrounding the hole 14. As shown in FIG. 2A, the press ram lowers the punch 16 lowers to a preset depth, so that the forming portion thereof draws the inner edge portion downwardly against a beveled upper edge 36 of the second die 20, thereby forming an annular drawformed flange portion 18. The press then begins its upstroke and removes upper punch 16 and punch pilot 17 from the tubular member 100. This causes the sharp, burred corner of annular flange portion 18 to be burnished smooth. As indicated by the arrow in FIG. 2B, the die 20 is then pulled out from the open end of the tubular frame member 100.

FIGS. 3A and 3B illustrate a steel can bushing 23 which has been preassembled in a separate operation from the punching operation. The tubular member 100 is placed in a holding fixture (not shown) that supports the underside of upper wall 10 close to the inner edge 25 of drawn flange 18. The bushing 23 is located directly above the hole 14 either manually or via the use of a machine. Downward pressure is applied to top surface 26 of the bushing 23 to force the busing through the hole 14 in the direction indicated by arrow 24. The pressure is then released and the finished assembly shown in FIG. 3B is produced with the bushing 23 being retained through an interference fit relation with the annular drawformed flange portion 18.

The problem with the above-described conventional method is that the fit between the exterior surface of the steel can bushing 23 and the annular drawformed flange portion 18 must be kept tight to ensure that the bushing 23 does not become separated from the tubular member 100. However, the fit must not be so tight that an extraordinarily high amount of effort is required to force the bushing 23 into the hole 14. Also, removal of the drawforming punch 16 burnishes the inner corner of the flange portion 18 which engages the bushing 23. As a result of this burnishing, the corner is smoother and does not "bite" into the bushing exterior to resist removal of the bushing.

SUMMARY OF THE INVENTION

It is therefore an object of the present invention to provide a sheet metal member with a bushing securely mounted therein which does not suffer the shortcomings of the construction described above. Specifically, it is an object of the present invention to ensure that the interference fit between the bushing and the sheet metal member is sufficient to prevent separation of the bushing from the member during normal vehicle operation. To achieve this object, one aspect of the present invention provides a method for mounting a bushing into a metal member which comprises providing a metal member forming a bushing receiving opening in the metal member, the opening defined by an annular edge portion surrounding the opening. A bushing is then forced through the opening in a bushing driving direction such that the bushing engages the annular edge portion and deforms the annular edge portion in the bushing driving direction to form an annular flange portion on the metal member which projects in the driving direction and engages an exterior surface of the bushing in an interference fit relation so as to securely retain the bushing within the opening.

In the method of the present invention, the need for a separate drawforming step, as in the above-described conventional method, is eliminated. The bushing itself acts as the drawforming tool as it is forced into the opening in the tubular member. Because the bushing acts as the drawforming tool, a tight interference fit between the annular wall portion and the bushing is ensured. Thus, the method of the present invention not only ensures a secure fit between the bushing and the tubular member, the method of the present invention also eliminates some of the tooling and operational steps of the conventional method.

Further, the corner of annular wall portion will not be burnished smooth because the drawforming tool (i.e., the bushing) is not withdrawn during the operation. An unburnished, burred, sharp corner is preferred because the sharp corner tends to "bite" into the exterior of the bushing when force is applied to the bushing in a direction opposite to the direction in which it was forced through the opening. Specifically, the annular flange portion will be drawn inwardly against the bushing as a result of such a force being applied to the bushing due to the sharp, burred corner being engaged with the bushing exterior.

This aspect of the present invention is more particularly related to a method for making a vehicle frame member with a shock absorbing mounting structure to be mounted to another structural component of a motor vehicle. The method comprises providing a tubular member surrounding a hollow interior and a lateral opening formed through the member. The member has an annular edge portion surrounding the opening. A shock absorbing mounting structure has a mounting portion constructed and arranged to be secured to the structural component of the motor vehicle and a yieldable shock absorbing portion associated with the mounting portion. The shock absorbing mounting structure is forced inwardly through the opening such that the mounting structure engages the annular edge portion and deforms the annular edge portion inwardly into the hollow interior of the tubular member to form an annular flange portion that engages an exterior surface of the mounting structure in an interference fit relation so as to securely retain the mounting structure within the opening, thereby enabling the tubular member to be resiliently mounted to the aforesaid structural component. Further, a portion of the second opposing surface adjacent the opening is supported while the mounting structure is being forced through the opening such that only the annular edge portion is substantially deformed by the mounting structure.

Another aspect of the present invention provides a metal member and bushing assembly comprising: a metal member having a bushing receiving opening formed therethrough and an annular flange portion surrounding the opening and projecting from the metal member in a bushing driving direction. A bushing is securely mounted inside the bushing receiving opening with the annular flange portion engaging the bushing in an interference fit relation as a result of the bushing being forced through the bushing receiving opening in the bushing driving direction such that the bushing engages an annular edge portion surrounding the opening and deforms the annular edge portion in the driving direction to form the annular flange portion.

It can be appreciated that a sheet metal member and bushing assembly constructed according to the principles of this aspect of the invention has a secure fit between the bushing and the sheet metal member. Failures due to varying tolerances between the bushing and the sheet metal member can be substantially eliminated because the bushing acts as the punch tool itself.

This aspect of the present invention is more particularly concerned with a vehicle frame member to be mounted to a structural component within a motor vehicle. The frame member comprises a tubular member surrounding a hollow interior. The tubular member has a lateral opening formed therethrough and an annular flange portion which surrounds the opening and projects inwardly into the hollow interior from the mounting portion. A shock absorbing mounting structure is securely mounted within the opening with the annular flange portion tightly engaging the mounting structure in an interference fit relation as a result of the mounting structure being forced inwardly through the opening such that the mounting structure engages an annular edge portion of the tubular member surrounding the opening and deforms the annular edge portion inwardly toward the hollow interior to form the annular flange portion. The mounting structure has a mounting portion constructed and arranged to be secured to the aforesaid structural component of the motor vehicle and a yieldable shock absorbing portion associated with the mounting portion. The mounting portion is constructed and arranged to enable the mounting structure to be resiliently mounted to the structural component. The shock absorbing portion permits relative movement between the mounting portion and the tubular wall to provide for limited relative movement between the tubular member and the structural component.

Other objects, features, and advantages of the present invention will become apparent from the following detailed description, the accompanying drawings, and the appended claims.

BRIEF DESCRIPTION OF THE DRAWINGS

These and other objects, features, and advantages of the present invention are better understood by reading the following detailed description of a preferred embodiment, taken in conjunction with the accompanying drawings, in which:

FIGS. 2A–B illustrate drawforming of a flange from the edge portion surrounding the hole in accordance with the conventional method;

FIGS. 4A–B illustrate combining the drawforming and assembly operations into a single operation in accordance with the principles of the present invention.

DETAILED DESCRIPTION OF THE PREFERRED EMBODIMENT OF THE INVENTION

Figure 1A:
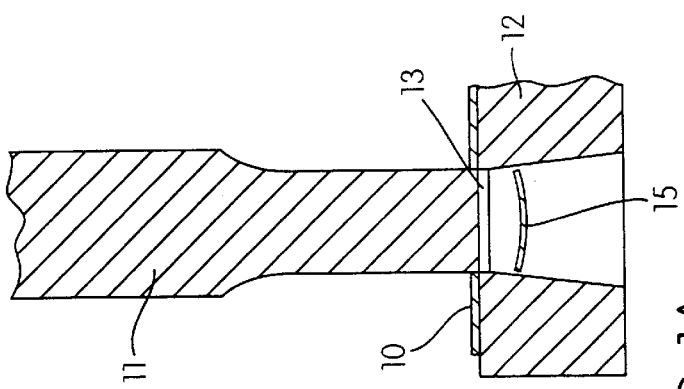
FIGS. 1A–B illustrate blanking of a hole in sheet metal in accordance with a conventional method.
Figure 1B:
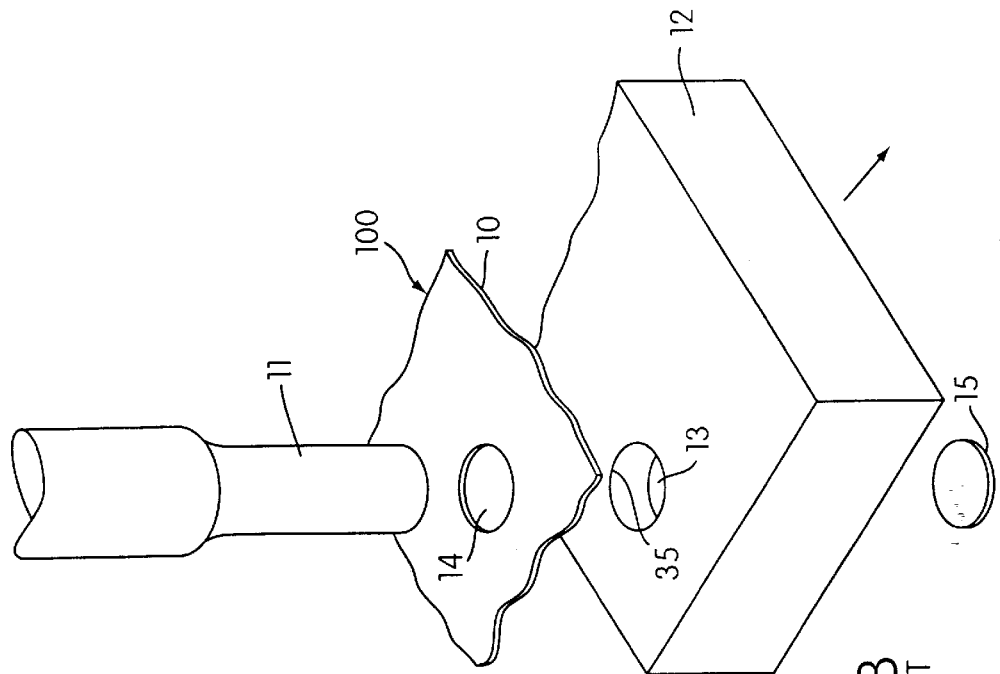
Figure 3B:
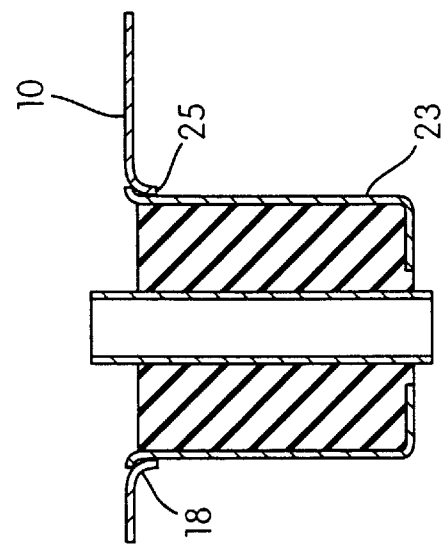
FIGS. 3A–B illustrate the steel can bushing being assembled into the sheet metal in accordance with the conventional method.
Figure 3A:
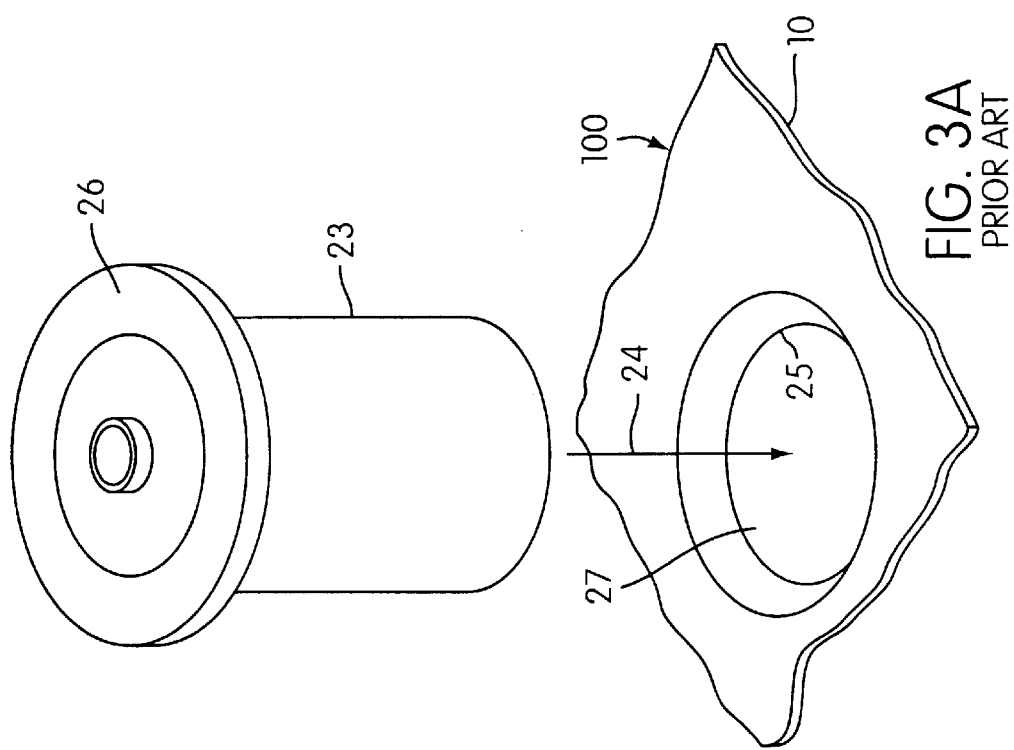

FIGS. 4A and 4B illustrate a method performed in accordance with the principles of the present invention wherein the operation of drawforming a flange portion and assembling a shock absorbing mounting structure into a tubular sheet metal member can be accomplished during a single operation. A hydroformed tubular frame member manufactured from a seam-welded piece of sheet metal (as is conventional in the hydroforming art) has a tubular wall, a portion of which is shown at 200, surrounding a hollow interior. The tubular wall 200 has an upper wall portion 110 (referred to as a mounting portion) with an opening or hole 131 formed therethrough. The conventional method shown in FIGS. 1A and 1B can be used to punch opening or hole 131 in the mounting portion 110. An extrusion die 130 is then inserted into an open end of the hydroformed tubular frame member and positioned adjacent the interior surface of the mounting portion 110.

A shock absorbing mounting structure in the form of a steel can bushing 123 is positioned adjacent to the exterior surface of the tubular wall 200 in substantial alignment with the hole 131 either manually or by use of a machine. For example, a locating pin (not shown) can be used to frictionally engage the inside diameter of a mounting sleeve 122 which extends from the bushing 123. A radial flange 144 extends outwardly from the upper edge of the side wall portion 140. As is conventional, the steel can bushing 123 comprises a cup-shaped outer sheet metal can having an annular side wall portion 140 and a generally circular bottom wall portion 142 formed integrally with the side wall portion 140. The mounting structure has a mounting portion in the form of the tubular mounting sleeve 122. The sleeve 122 is inserted through a hole formed in the bottom wall portion 142 of the can with opposing ends of the sleeve 122 protruding above the top edge of side wall portion 140 and below the bottom wall portion 142. The interior of the bushing 123 is filled with a shock absorbing material 146, such as solidified rubber or another yielding resiliently deformable material which defines a shock absorbing portion. The mounting sleeve 122 is constructed and arranged to be joined with a structural component of the motor vehicle (not shown). The term structural component can include any number of components within the motor vehicle, including other vehicle frame components, suspension and chassis components, engine cradle components, body components, etc.

To assemble the bushing 123 to the tubular wall 200, the operator initiates operation of a punch tool or a press rain 124 to drive the ram 124 through its downstroke under hydraulic pressure. During the downstroke, the ram 124 contacts a top surface 126 of steel can bushing 123. The diameter of the bottom wall portion 142 of the can bushing 123 is slightly greater than the diameter of hole 131 and slightly smaller than the diameter of an opening 129 in lower die 130. This relationship enables the steel can bushing 123 to act as a punch or drawforming tool during the downstroke of the press ram 124. Specifically, as the press ram 124 continues through its downstroke in a bushing driving direction which extends inwardly with respect to the tubular member, the bottom wall portion 142 of the outer can engages an annular edge portion 128 surrounding the hole 131. Continued downward movement of the press rain 24 in the bushing driving direction causes the bushing 123 to deform the annular edge portion against a beveled or angled upper edge 132 surrounding the extrusion die opening 129 so that the edge portion 128 extends inwardly from the interior surface of the upper wall portion 110 as an annular flange portion. The steel can bushing 123 widens the hole 131 as it is forced downwardly so that the steel can bushing 123 is eventually received within the die opening 129. The press ram 124 stops at a predetermined depth or height as shown in FIG. 4B, and then returns through an upstroke to the start position. After the press ram 124 is disengaged from the top surface 126 and the pressure on the bushing 123 is released, the deformed inner edge or annular flange portion 128 of the upper wall 110 forced against beveled edge 132 springs back (under the natural spring back force of metal material) against the exterior surface of steel can bushing 123 to firmly grasp and hold steel can bushing 123 to in position. Because the bushing 123 acts as the punch or drawforming tool, the interference fit between the bushing 123 and the annular flange portion is extremely tight and the quality problems associated with the conventional method are obviated.

Because no removal of a punch during drawforming is performed, the corner of the inner edge/annular flange portion 128 is not burnished smooth. In other words, because steel can bushing 123 travels in one direction while forming the annular flange portion 128, the flange portion corner does not become burnished smooth like in the method discussed above with respect to FIGS. 2A and 2B. The unburnished corner of the flange portion 128 remains sharped and burred and helps to hold the steel can bushing 123 in place. Specifically, the unburnished corner of the flange portion 128 digs or bites into the exterior of the can. As a result, when the bushing 123 is being pulled outwardly from the hole 13 1, the unburnished corner will also be pulled upwardly so that the flange portion 128 will be drawn tighter to the bushing 123. As a result of using the present invention, the failure rate during push/pull out testing is reduced as compared to other assembly methods.

With the bushing 123 securely mounted within the hole 131, the finished product can then be utilized as a vehicle frame member. The bushing mounting sleeve 122 mounts the frame member to the vehicle structural component in shock absorbing relation which the shock absorbing material 146 permits limited relative movement between the tubular wall 200 and the mounting sleeve 122 in a resilient, yielding manner to provide for limited relative movement between the vehicle frame member and the structural component. Specifically, it is contemplated that a bolt will be inserted through the mounting sleeve 122 and connected to the vehicle structural component to secure the frame member in place.

While a preferred embodiment and details of the invention have been described above, it will be apparent to those skilled in the art that various changes and modifications may be made without departing from the scope of the invention. For example, while the present invention has been described in conjunction with the preferred hydroformed tubular frame member, the principles applied herein can be used to assemble a bushing to any sheet metal member, whether they be tubular or flattened sheet metal members.

It should be noted that the appended claims are not phrased in the "means for performing a specified function" format permitted by 35 U.S.C. § 112, paragraph 6. This is point out that the appended claims are not intended to be interpreted under § 112, å6 as being limited solely to the structures, acts, or materials disclosed in the present application and the equivalents thereof.

What is claimed is:

1. A method for mounting a bushing into a metal member, said method comprising:

provinding a metal member having first and second opposing surfaces with a thickness between said surfaces which is relatively small in comparison to the surface area of said surfaces, forming a bushing receiving opening in said metal member, said opening defined by an annular edge portion surrounding said opening;

positioning a bushing adjacent to said first opposing surface, said bushing having a cylindrical exterior surface portion and including a resilient mounting material; and forcing said bushing through said opening in a bushing driving direction such that said bushing engages said annular edge portion and deforms said annular edge portion in said bushing driving direction and engages said cylindrical exterior surface portion of said bushing in an interference fit relation so as to securely retain said bushing within said opening, said interference fit relation generated by said bushing engaging and deforming said annular edge portion being the sole securement that secures said bushing to said metal member.

2. A method according to claim 1, wherein said bushing is generally cylindrical and said bushing receiving opening is generally circular.

3. A method according to claim 2, further comprising:
before forcing said bushing through said opening, positioning a supporting die to support a portion of the second opposing surface adjacent said opening to cooperate with said bushing while said bushing is being forced through said opening so that only said annular edge portion of said metal member is substantially deformed by said bushing.

4. A method according to claim 3, wherein said supporting die has a bushing receiving space positioned and configured to receive said bushing as said bushing is being forced through said bushing receiving opening.

5. A method according to claim 4, wherein said supporting die has an angled edge portion surrounding said bushing receiving space, said angled edge portion being positioned adjacent to said annular edge portion while said supporting die supports said bushing mounting portion such that said annular edge portion is deformed against said angled edge portion and said angled edge portion limits the deformation of said annular edge portion.

6. A method according to claim 2, further comprising:
before forcing said bushing through said bushing receiving opening, aligning said bushing with said bushing receiving opening; and
wherein said bushing is thereafter forced through said bushing receiving opening by engaging a driving tool with said bushing and moving said tool in said bushing driving direction.

7. A method according to claim 6, further comprising:
after forcing said bushing through said bushing receiving opening, disengaging said driving tool from said bushing such that said deformed annular flange portion resiliently moves inwardly against said bushing to enhance the aforesaid interference fit relation.

8. A method according to claim 1, wherein said metal member is a sheet of steel material.

9. A method according to claim 1, wherein said metal member is a tubular member.

10. A method according to claim 9, wherein said tubular member is hydroformed into a desired configuration.

11. A method according to claim 1, wherein said bushing comprises an outer metal can member with an annular side wall portion and a bottom wall portion integrally formed with said annular side wall portion,
said bushing further comprising mounting structure extending upwardly from said bottom wall portion beyond an upper edge of said side wall portion, and shock absorbing material disposed inside said can member in surrounding relation with respect to said mounting structure.

12. A method according to claim 11, wherein said mounting structure is a tubular mounting sleeve.

13. A method according to claim 11, wherein said shock absorbing material is rubber.

14. A method for making a vehicle frame member with a shock absorbing mounting structure to be mounted to another structural component of a motor vehicle, said method comprising:
providing a tubular member surrounding a hollow interior, said tubular member having a lateral opening formed therethrough and an annular edge portion surrounding said opening, said tubular member having a first opposing surface facing outwardly away from said hollow interior and a second opposing surface facing inwardly towards said hollow interior with a thickness between said opposing surfaces which is relatively small in comparison to the surface areas of said opposing surfaces;
providing a shock absorbing mounting structure having a mounting portion constructed and arranged to be secured to the structural component of the motor vehicle and a yieldable shock absorbing portion associated with said mounting portion;
positioning said shock absorbing mounting structure adjacent said first opposing surface and forcing said mounting structure inwardly with respect to said tubular member through said opening such that said mounting structure engages said annular edge portion and deforms said annular edge portion inwardly into the hollow interior of said tubular member to form an annular flange portion that engages an exterior surface of said mounting structure in an interference fit relation so as to securely retain said mounting structure within said opening, thereby enabling said tubular member to be resiliently mounted to the aforesaid structural component, said interference fit relation generated by said shock absorbing mounting structure engaging and deforming said annular edge portion being the sole securement that secures said shock absorbing mounting structure to said tubular member; and
supporting a portion of said second opposing surface adjacent said opening while said mounting structure is being forced through said opening such that only said annular edge portion is substantially deformed by said mounting structure.

15. A method according to claim 14, further comprising:
before forcing said mounting structure through said opening, positioning a supporting die adjacent said portion of said second opposing surface adjacent said opening such that said supporting die supports said tubular wall while said mounting structure is being forced through said opening so that only said annular edge portion is substantially deformed by said mounting structure.

16. A method according to claim 15, wherein said supporting die has a mounting structure receiving space positioned and configured to receive said mounting structure as said mounting structure is being forced through said opening.

17. A method according to claim 16, wherein said supporting die has an angled edge portion surrounding said bushing receiving space, said angled edge portion being positioned adjacent to said annular edge portion while said supporting dies supports said mounting portion such that said annular edge portion is deformed against said angled edge portion and said angled edge portion limits the deformation of said annular edge portion.

18. A method according to claim 15, further comprising:
before forcing said mounting structure through said opening, aligning said mounting structure with said opening; and
wherein said mounting structure is thereafter forced through said opening by engaging a driving tool with said mounting structure and moving said tool inwardly with respect to said tubular member.

19. A method according to claim 18, further comprising:
after forcing said mounting structure through said opening, disengaging said driving tool from said mounting structure such that said deformed annular flange portion resiliently moves inwardly against said mounting structure to enhance the aforesaid interference fit relation.

20. A method according to claim 14, wherein said shock absorbing mounting structure is a generally cylindrical bushing.

21. A method according to claim 20, wherein said mounting structure comprises an outer metal can with an annular side wall portion and a bottom wall portion integrally formed with said side wall portion, said mounting portion of said mounting structure being a mounting member projecting generally upwardly from said bottom wall portion beyond an upper edge of said side wall portion, said mounting member being constructed and arranged to be joined with the structural component of the vehicle, and said shock absorbing portion of said mounting structure being resiliently deformable shock absorbing material disposed inside said can in surrounding relation with respect to said mounting member.

22. A method according to claim 21, wherein said mounting member is a tubular mounting sleeve.

23. A method according to claim 21, wherein said shock absorbing material is solidified rubber.

24. A method according to claim 14, wherein said tubular member is hydroformed into a desired configuration.

25. A method according to claim 14, wherein said tubular member is metal.

26. A method according to claim 25, wherein said tubular member is steel.

27. A method according to claim 14, wherein
said exterior surface of said mounting structure is cylindrical.

* * * * *